United States Patent
Cook et al.

(10) Patent No.: US 11,778,251 B2
(45) Date of Patent: Oct. 3, 2023

(54) SELECTIVE MPEG PACKET ENCRYPTION AND DECRYPTION BASED UPON DATA AND SECURITY PRIORITIES

(71) Applicant: ARRIS Enterprises LLC, Suwanee, GA (US)

(72) Inventors: Lawrence Robert Cook, Santee, CA (US); Mark Steven Schmidt, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/343,401

(22) Filed: Jun. 9, 2021

(65) Prior Publication Data

US 2021/0392385 A1    Dec. 16, 2021

Related U.S. Application Data

(60) Provisional application No. 63/037,738, filed on Jun. 11, 2020.

(51) Int. Cl.
*H04N 21/2347* (2011.01)
*H04N 19/50* (2014.01)
(Continued)

(52) U.S. Cl.
CPC ..... *H04N 21/2347* (2013.01); *H04L 63/0457* (2013.01); *H04N 19/50* (2014.11);
(Continued)

(58) Field of Classification Search
CPC ......... H04N 21/23605; H04N 21/2541; H04N 21/4405; H04N 21/6118; H04N 19/50; H04L 63/0457
See application file for complete search history.

(56) References Cited

U.S. PATENT DOCUMENTS

6,415,031 B1 * 7/2002 Colligan .......... H04N 21/23473
713/160
2003/0026423 A1 * 2/2003 Unger ................ H04N 21/4516
380/216
(Continued)

*Primary Examiner* — Yassin Alata
(74) *Attorney, Agent, or Firm* — Chernoff, Vilhauer, McClung & Stenzel, LLP (57) ABSTRACT

A cable distribution system that includes a head end connected to a plurality of customer devices through a transmission network that includes a remote fiber node that converts digital data to analog data suitable for the plurality of customer devices, where the head end includes a processor. A packetized elementary stream of a video is provided from the head end to customer devices through the transmission network, wherein the packetized elementary stream includes a plurality of groups comprising pairs of packetized elementary stream headers and packetized elementary stream payloads. A first one of the plurality of groups corresponding to a non-predicted coded picture of the video of the packetized elementary stream is determined. The first one of the plurality of groups is encrypted while not encrypting all of the plurality of groups of the video. A signal is provided from a conditional access system to a selected one of the plurality of customers that is suitable to be used to decrypt the first one of the plurality of groups.

16 Claims, 9 Drawing Sheets

(51) Int. Cl.
*H04N 21/254* (2011.01)
*H04L 9/40* (2022.01)
*H04N 21/4405* (2011.01)
*H04N 21/61* (2011.01)
*H04N 21/236* (2011.01)

(52) U.S. Cl.
CPC ... *H04N 21/23605* (2013.01); *H04N 21/2541* (2013.01); *H04N 21/4405* (2013.01); *H04N 21/6118* (2013.01)

(56) References Cited

U.S. PATENT DOCUMENTS

| | | | |
|---|---|---|---|
| 2006/0165232 A1* | 7/2006 | Burazerovic | H04N 7/1675 |
| | | | 348/E7.071 |
| 2013/0064368 A1* | 3/2013 | Lefebvre | H04N 21/2389 |
| | | | 380/287 |
| 2016/0036783 A1* | 2/2016 | Penugonda | H04L 67/02 |
| | | | 713/168 |
| 2016/0142746 A1* | 5/2016 | Schuberth | H04N 21/236 |
| | | | 725/31 |

* cited by examiner

SELECTIVE MPEG PACKET ENCRYPTION AND DECRYPTION BASED UPON DATA AND SECURITY PRIORITIES

CROSS REFERENCE TO RELATED APPLICATIONS

This application claims the benefit of U.S. Provisional Patent Application Ser. No. 63/037,738 filed Jun. 11, 2020.

BACKGROUND

The subject matter of this application relates to selective MPEG packet encryption and decryption.

Video services are used to deliver entertainment and education to viewers. The source material (audio, video, etc.) is multiplexed into a combined signal which is then used to modulate a carrier. This carrier is commonly known as a channel. In a terrestrial system, these channels correspond to government assigned frequencies and are distributed over the air. The program is delivered to a receiver that has a tuner that pulls the signal from the air and delivers it to a demodulator, which in turn provides video to a display and audio to speakers. In a cable system the modulated channels are carried over a cable. There may also be an in-band or out-of-band feed of a program guide indicating what programs are available and the associated tuning information. The number of cable channels is finite and limited by equipment/cable bandwidth. Cable distribution systems require a significant capital investment and are expensive to upgrade.

Video services are valuable to its producers, therefore copyright holders want to control access and restrict copies. Examples of typically protected material include feature films, sporting events, and adult programming. Conditional access (CA) systems are used to control availability of programming in content delivery systems such as cable systems. CA systems come as matched sets—one part is integrated into the cable system headend and encrypts video services, the other part provides decryption and is built into the set-top boxes (STB) installed in users' homes.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
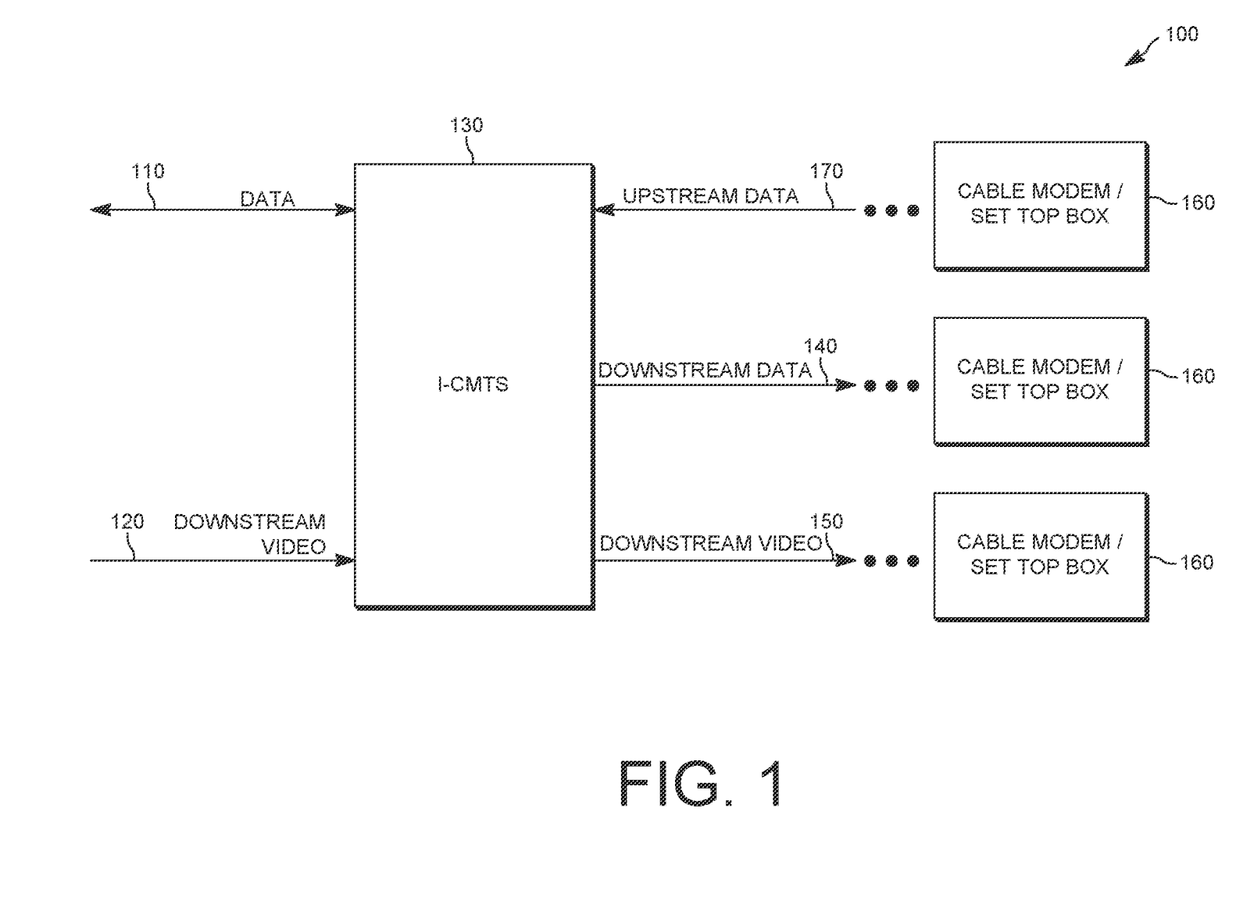
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and the Internet and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
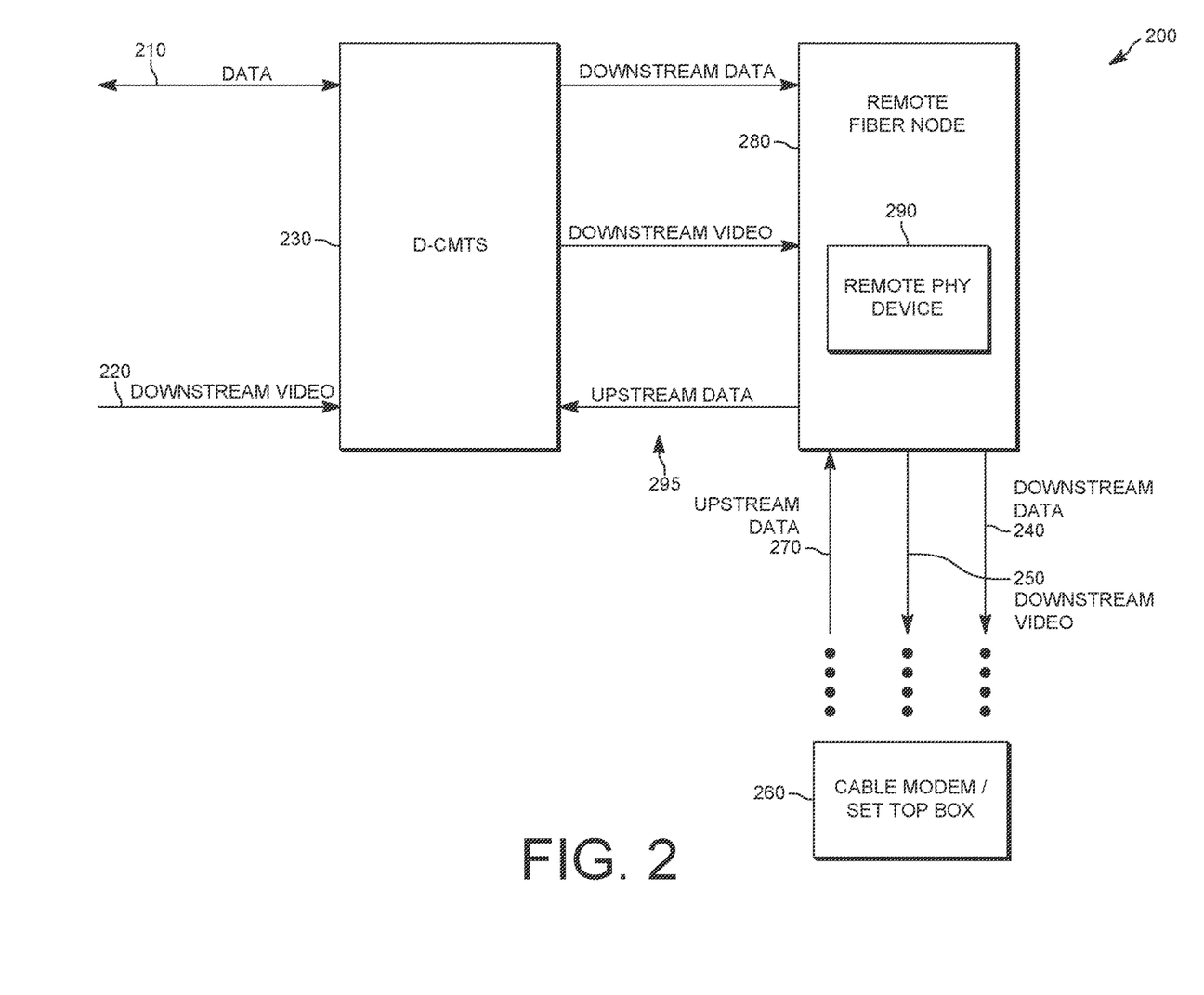
FIG. 2 illustrates a distributed Cable Modem Termination System.

Referring to FIG. 2, as a result of increasing bandwidth demands, limited facility space for integrated CMTSs, and power consumption considerations, Distributed Cable Modem Termination System (D-CMTS) 200 (e.g., Distributed Converged Cable Access Platform (CCAP)) have been developed. In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the MAC and/or PHY layers of a portion of the system. The D-CMTS 200 may include a D-CMTS 230 (e.g., core) that includes data 210 that is sent and received over the Internet (or other network) typically in the form of packetized data. The D-CMTS 230 may also receive downstream video 220, typically in the form of packetized data from an operator video aggregation system. The D-CMTS 230 receives and processes the received data 210 and downstream video 220. A remote fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with pseudowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230.

By way of example, the remote PHY device 290 may convert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or analog optics, to digital for transmission to the D-CMTS 230. As it may be observed, depending on the particular configuration, the R-PHY may move all or a portion of the DOCSIS MAC and/or PHY layers down to the fiber node.

Figure 3:
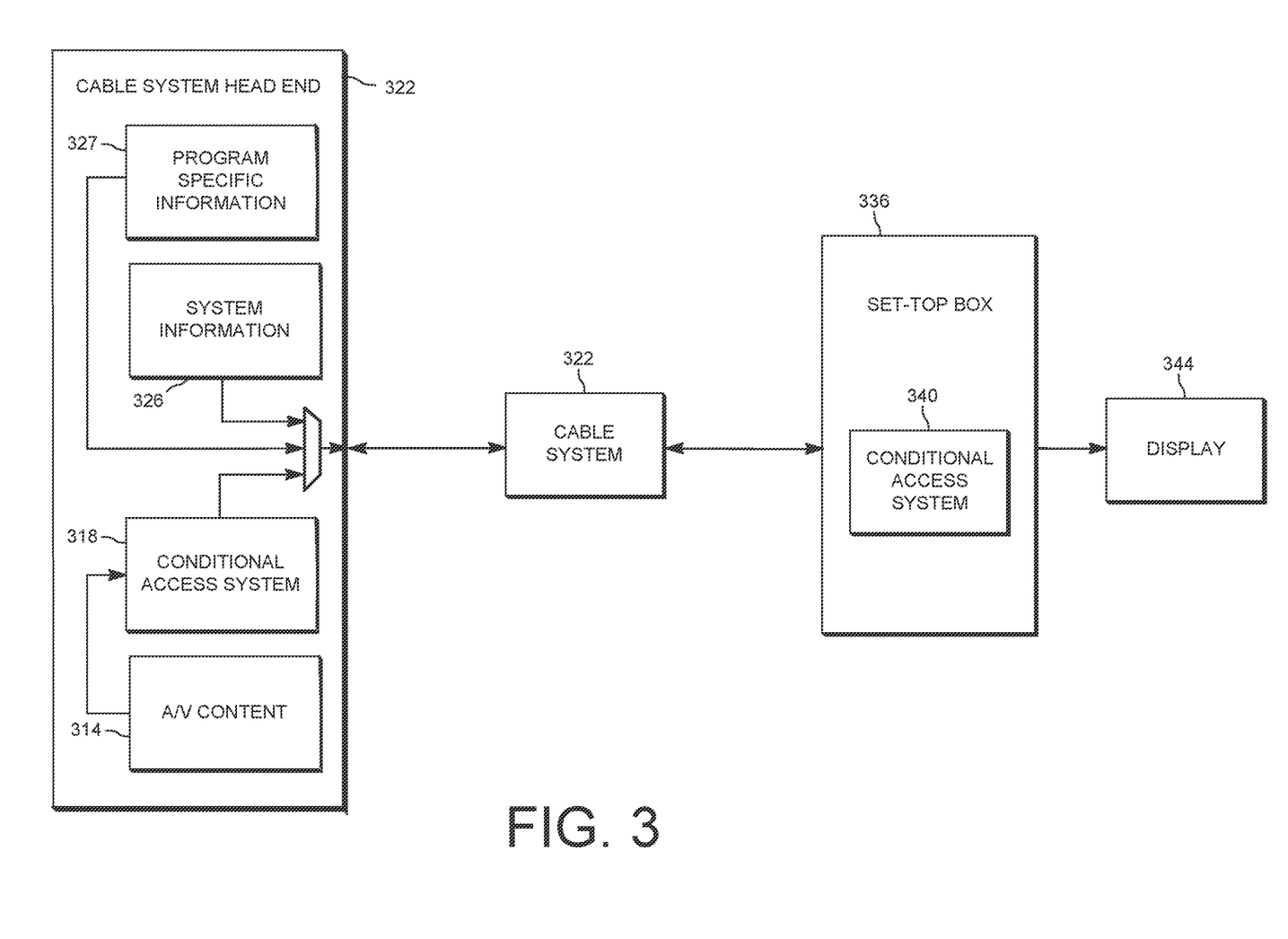
FIG. 3 illustrates a layered network processing stack.

A simplified cable system arrangement is depicted in FIG. 3. The cable operator processes audio/video (A/V) content 314 with a conditional access system 318 at the cable system-headend 322. The encrypted A/V content along with system information (SI) 326 and program specific information (PSI) 327 is multiplexed together and transmitted over the cable system 332 to a user's set top box 336. The set top box 336 incorporates a decrypting conditional access system 340 that decrypts the A/V content. The decrypted A/V content can then be supplied to a display 344 for viewing by the customer.

The digital program streams are broken into packets for transmission, such as using a MPEG-2 elementary stream. Packets for each component of a program (video, audio, auxiliary data, etc.) are tagged with a packet identifier or PID. These packet streams for each component of all programs carried within a channel are aggregated into one composite stream, generally referred to as a transport stream. Additional packets are also included to provide decryption keys and other overhead information. Otherwise unused bandwidth is filled with null packets. Bandwidth budgets are usually adjusted to utilize about 95% of the available channel bandwidth.

In a conditional access system, the head end may provide electronic control messages and entitlement management messages. The conditional access system typically transmits a control word used to descramble the signal to the set top box in a secure manner. The control word is typically placed in a message called an electronic control message (ECM) which is encrypted in a proprietary way and then inserted into the transport stream. The entitlement management message (EMM) is used to send entitlements to the set top box, for instance information such as "Allow the user to view this group of channels the next month" or "Allow the user to watch this Video On Demand movie". The set top box will receive the entitlement management messages and use the information in the entitlement management messages to update its internal access control database containing a list of channels and video on demand movies the user is allowed to watch. The entitlement management message can authorize the set top box to allow viewing of a video on demand movie for a couple of hours, or one or more channels for one or several months to come. When the set top box receives electronic control messages it will use the information in the access control database to decide if the user has access to the channel or not. If the user has access to the channel a decrypted control word will be used by the set top box which can then descramble the signal. It is noted that the decryption keys typically change on a regular basis. In order for a customer to have a satisfying viewing experience, it is generally desirable that the customer have clear access to both the audio and the video content.

Figure 4A:
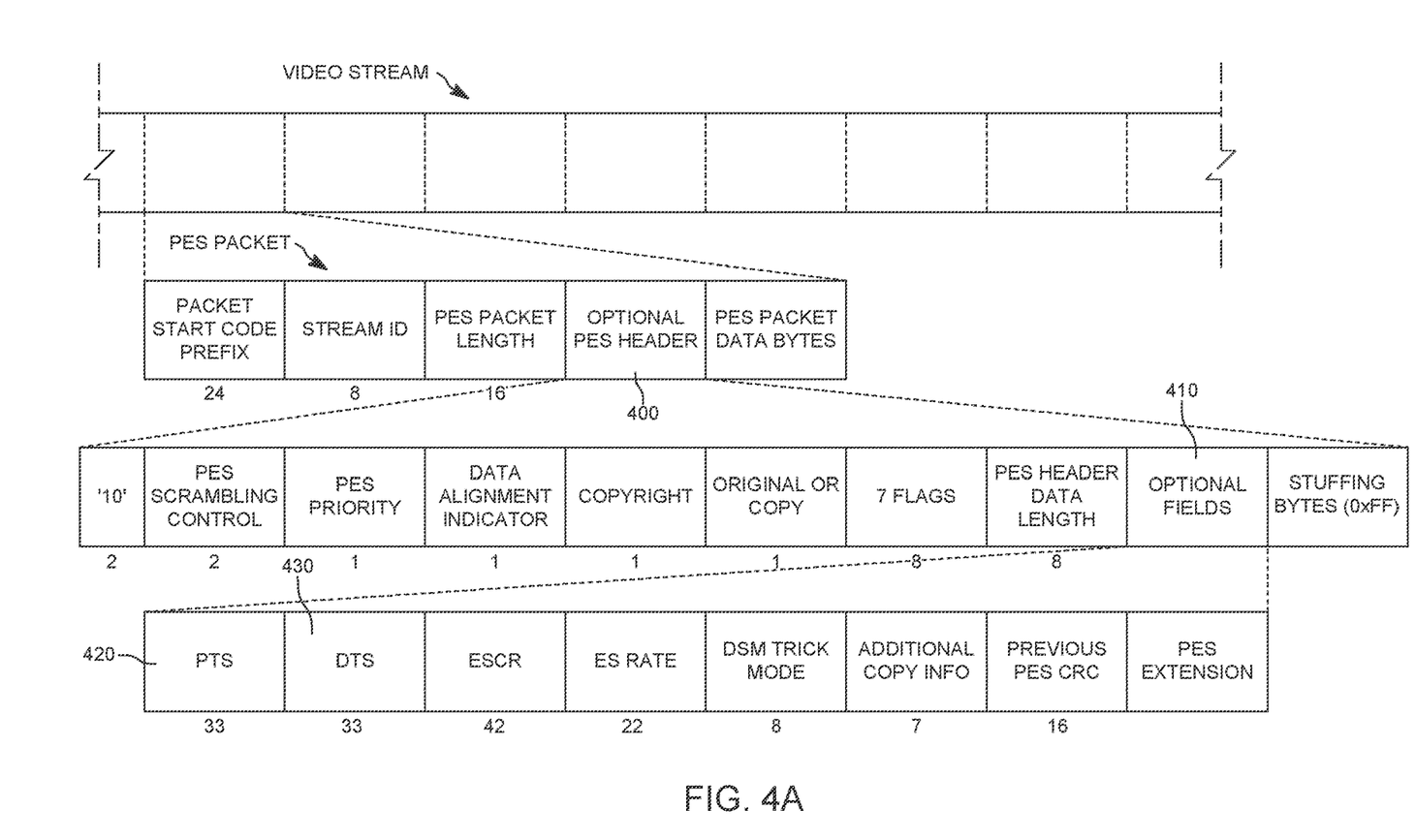
FIG. 4A illustrates an MPEG-2 packetized elementary stream packet.
Figure 4B:
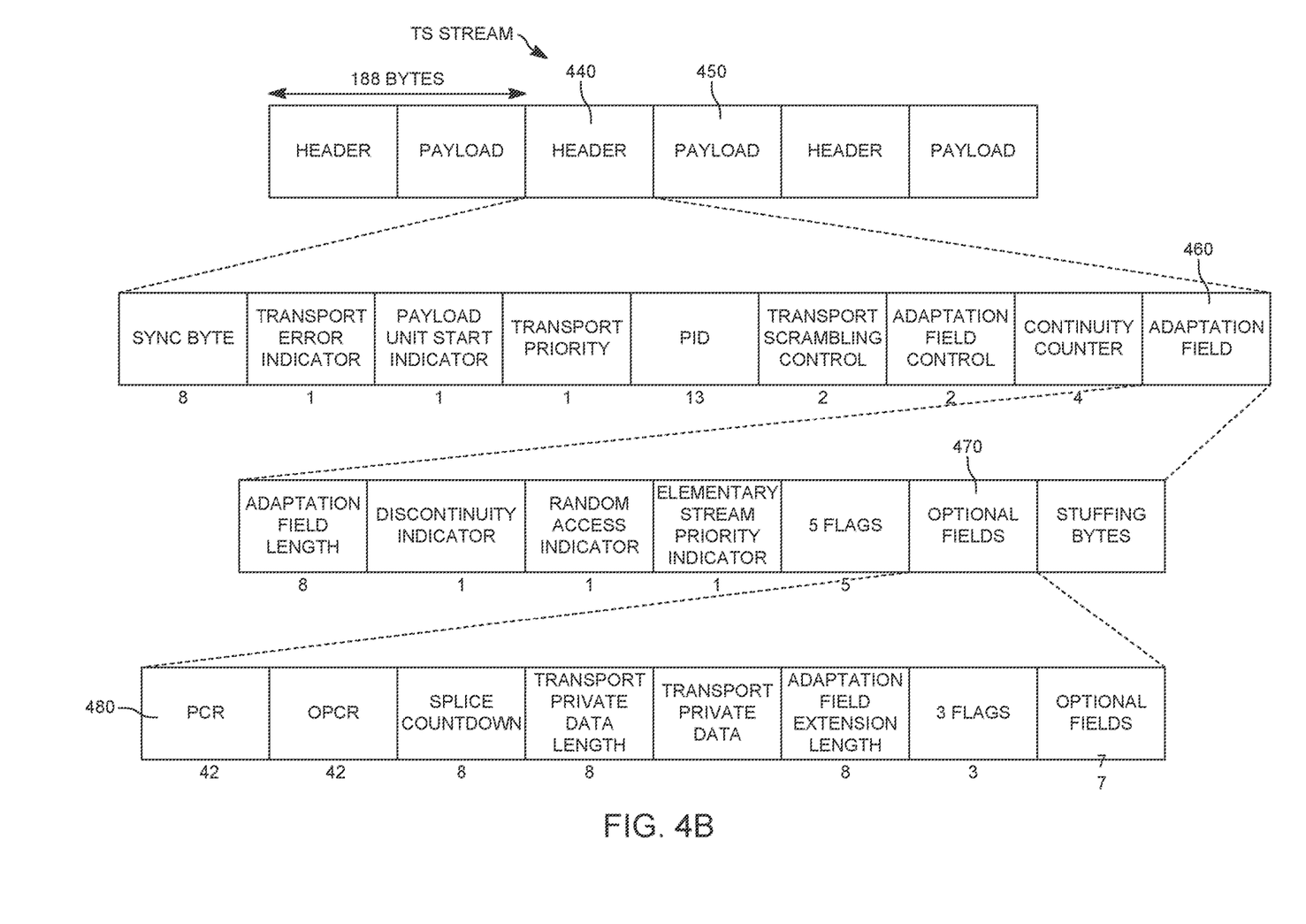
FIG. 4B illustrates an MPEG-2 transport stream.

Referring to FIG. 4A and to FIG. 4B, an MPEG-2 packetized elementary stream (PES) packet and an MPEG-2 TS, respectively, are illustrated. Referring to FIG. 4A, an MPEG-2 video stream, which is compressed using an encoder, is packetized into PES packets. Each of the PES packets includes an optional PES header and a PES packet data field. The optional PES header 400 includes an optional field 410. The optional field 410 includes a PTS field 420 and a DTS field 430. The PTS information is recorded in the PTS field 420, and the DTS information is recorded in the DTS field 430.

Referring to FIG. 4B, a TS, which is formed through a multiplexing process, is 188 bytes long and includes a header 440 and a payload 450. A PES packet or a program association table (PAT), or a program map table (PMT) are contained in the payload 450. The header 440, which starts with a sync byte, includes various fields, such as an adaptation field 460. The adaptation field 460 includes an optional field 470, and the optional field 470 includes a PCR field 480. PCR information, which is reference time information, is recorded in the PCR field 480. For MPEG-2 each packet carries 184 bytes of payload data, which may be optionally encrypted, prefixed by 4 bytes of header which is not encrypted. MPEG-2 is described in ISO 13818-1 "Information technology—Generic coding of moving pictures and associated audio information: Systems", incorporated by reference herein in its entirety.

For cable network systems where the content is delivered on QAM frequencies the traditional technique has involved the encryption of all payload bytes of each packet of a MPEG elementary stream. This ensures that the content described therein is difficult to decode by those who are not authorized to view the content, and in the case of adult content is not inadvertently viewed by minors. While the encryption of all payload bytes of each packet of a MPEG elementary stream is effective, it tends to be computationally expensive for set top boxes with limited computational resources. Further, with an encryptor handling numerous simultaneous services, decrypting less packets per service linearly allows encrypting more services per CPU, thus providing a more computationally efficient solution. It is noted that one QAM frequency has multiple channels, where each of the channels is a separate service that is separately encoded. In light of the limited computational resources of the set top box, it is preferable to encrypt only a selected set of packets of the MPEG elementary stream. The selected manner of packet encryption should be selected in such a manner that the content itself if not observable when tuned to the encrypted channel, even in a generally scrambled manner, so that adult content is not inadvertently viewed by minors. Also, the selected manner of packet encryption should be selected in such a manner that the content is difficult for an unauthorized viewer to decrypt.

Figure 5:
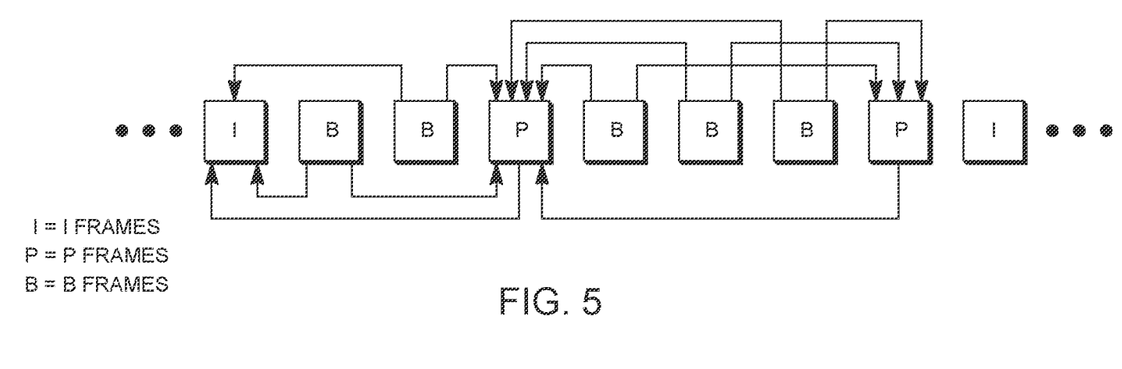
FIG. 5 illustrates a set of I, P, and B frames.

Referring to FIG. 5, modern video compression standards such as MPEG-2, MPEG-4 or Advanced Video Coding (AVC), or High-Efficiency-Video-Coding (HEVC), include three basic types of coded frames, namely, intra-coded frames (I-frames), predictive-coded frames (P-frames) and bidirectionally-predictive-coded frames (B-frames). An I-frame is a separately compressed version of a single uncompressed frame. The I-frame is coded based upon spatial redundancy and does not depend on data in a preceding frame or a following frame. A P-frame, a predicted frame generally referred to as delta-frames, is based upon changes in the image from a previous frame to encode its content. A B-frame, a bidirectionally predicted frame, is based upon changes in the images from a predicted frame and a following frame to encode its content.

Figure 6:
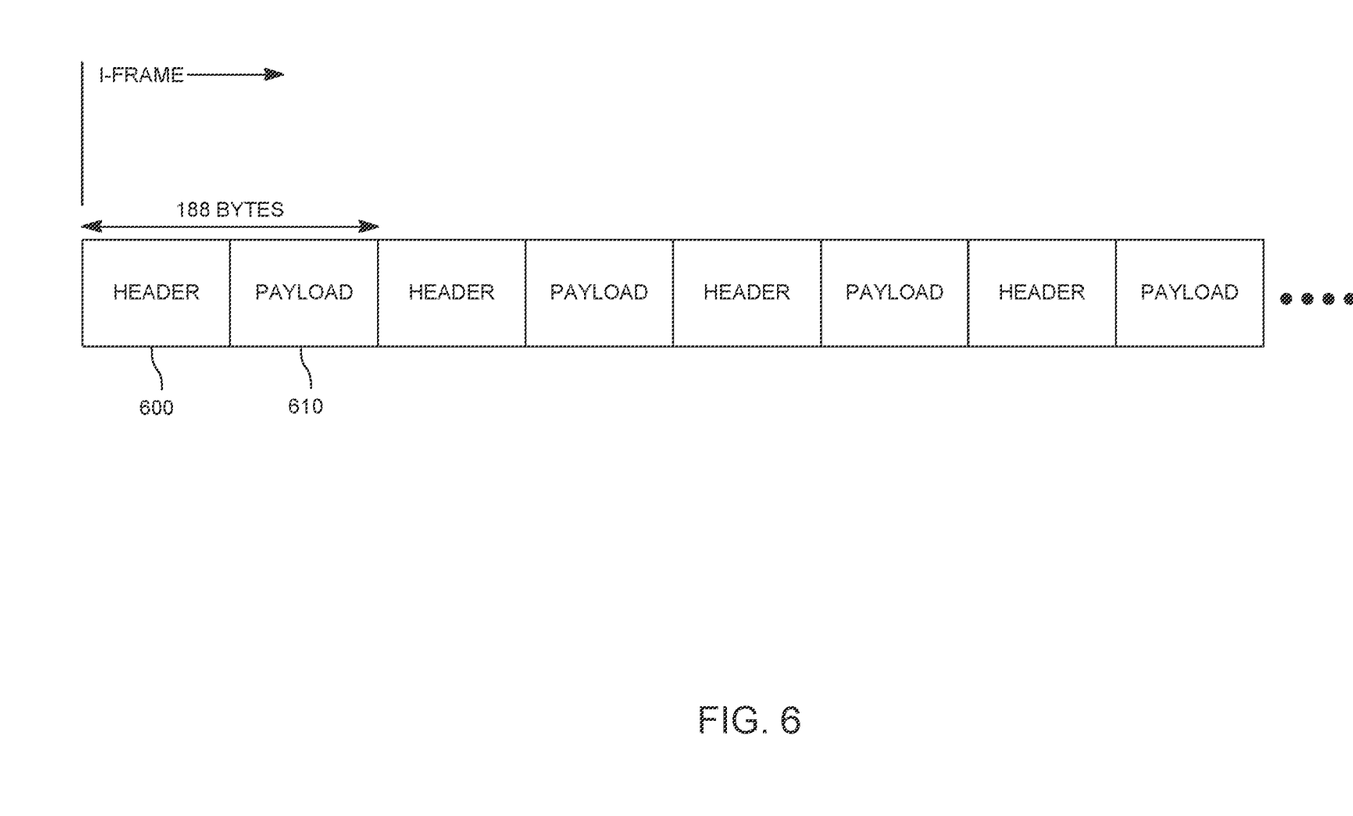
FIG. 6 illustrates a transport stream with one non-encrypted header and with one encrypted payload.

Referring to FIG. 6, with a desire to ensure that none of the frames of the video content are decodable in a manner where the content is observable by the viewer, it is desirable that the first packet payload 610 of each of the I-frames is encrypted. The combination of the first (and sometimes second) packet payload include sequence parameter set metadata, picture parameter set metadata, slice header metadata, etc. that are used for the decoding of the I-frame. The selective encryption of the first packet payload of the I-frame has the effect of resulting in substantial difficulty in rendering the corresponding I-frame without proper decryption. The additional packet payloads of the respective I-frame are preferably not encrypted. The P-frames and B-frames are predicted, at least in part, based upon the I-frame. Without the I-frame being suitable for decoding because of the encryption, the corresponding P-frames and B-frames are likewise not suitable for rendering content because of the encryption as of result of referencing the I-frame for predictive information, and therefore are preferably not encrypted to reduce the computational complexity of the system.

Figure 7:
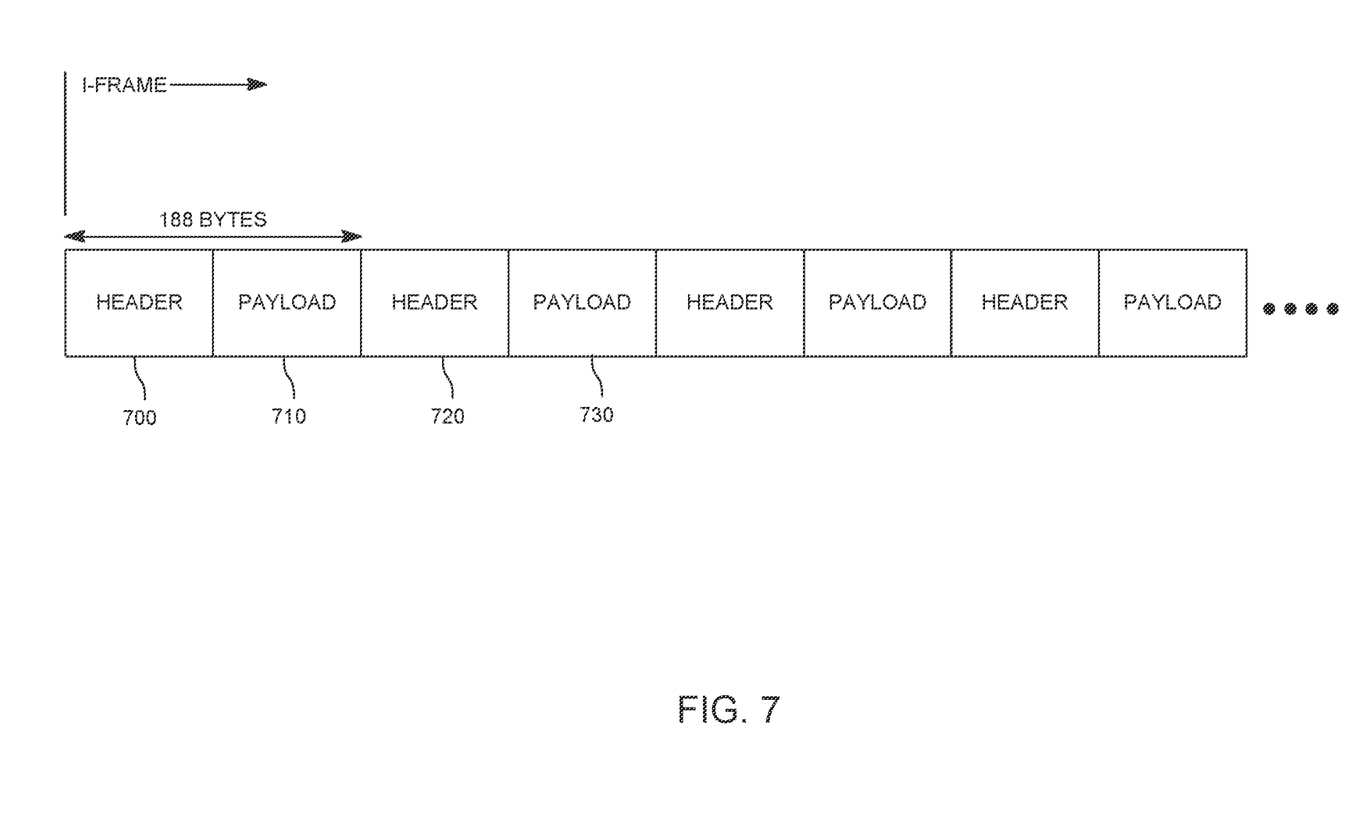
FIG. 7 illustrates a transport stream with non-encrypted headers and with two encrypted payloads.

Referring to FIG. 7, with a desire to further ensure that none of the frames of the video content are decodable in a manner where the content is observable by the viewer, it was determined that context-adaptive binary arithmetic coding (CABAC) is a form of entropy encoding used with MPEG type bitstreams, that where the second packet may include metadata content as a result of the CABAC coding, such as for example macroblock data information. The combination of the first packet payload 710, and a second packet payload 730 may include sequence parameter set metadata, picture parameter set metadata, slice header metadata, etc. that are used for the decoding of the I-frame. The selective encryption of the first and second packet payloads of the I-frame has the effect of further increasing difficulty in rendering the corresponding I-frame without proper decryption. The additional packets of the respective I-frame are preferably not encrypted. The P-frames and B-frames are predicted, at least in part, based upon the I-frame. Without the I-frame being suitable for decoding because of the encryption, the corresponding P-frames and B-frames are likewise not suitable for rendering content because of the encryption as of result of referencing the I-frame for predictive information, and therefore are preferably not encrypted to reduce the computational complexity of the system.

Figure 8:
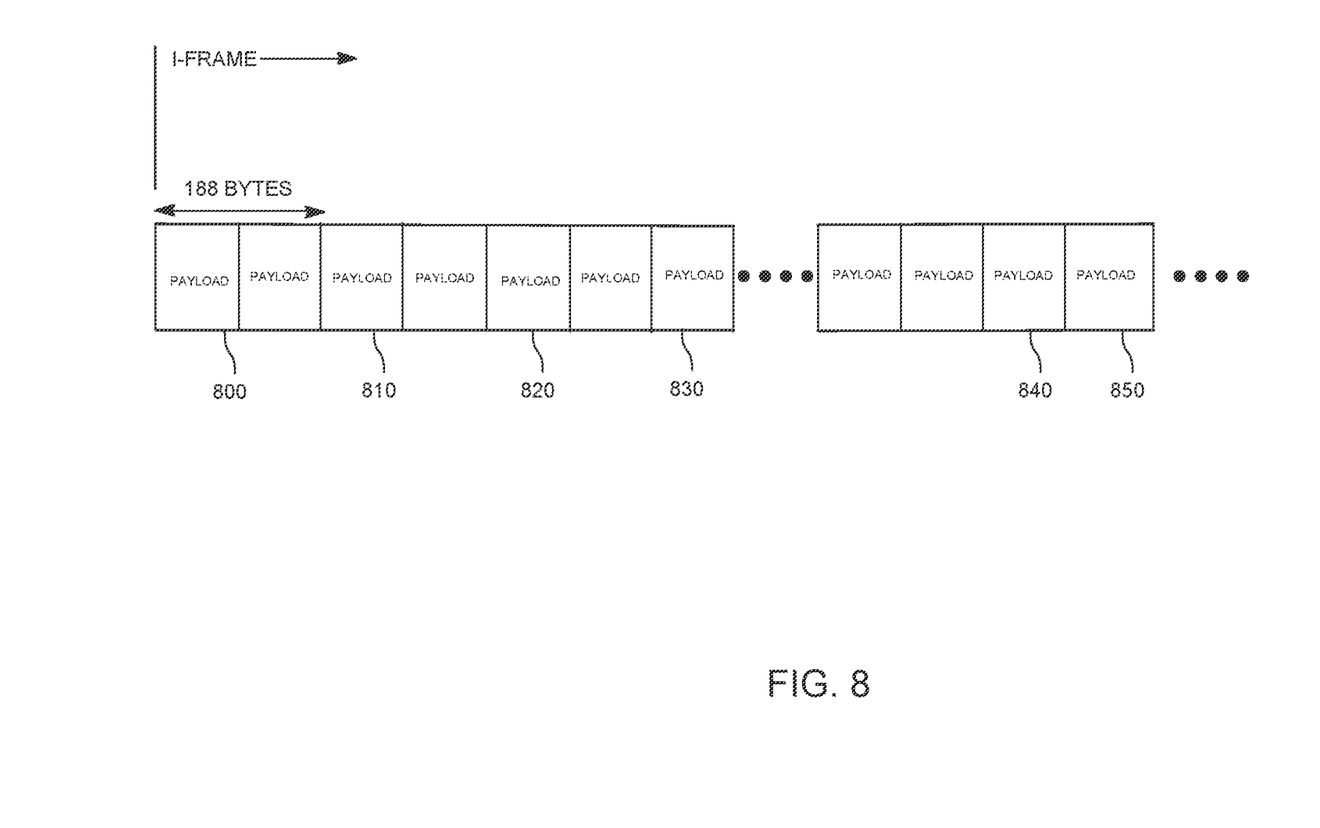
FIG. 8 illustrates a transport stream with non-encrypted headers and with two encrypted payloads together with periodic encrypted payloads.

Referring to FIG. 8, with a desire to even further ensure that none of the frames of the video content are decodable in a manner where the content is observable by the viewer, in a manner that has reduced computational complexity impact on the system, a periodic set of packet payloads may be encrypted, such as every $5^{th}$ to $15^{th}$ set of packet payloads, and more preferably every $10^{th}$ set of packet payloads. The combination of encrypting the first packet payload 810, and/or the second packet payload 830 at the start of a PES packet for every I, P, or B frame, together with encrypting the periodic packet payloads 850 has the effect of further increasing the difficulty in rendering the corresponding I-frame, P-frames, and/or B-frames without proper decryption. The periodic packet payloads are preferably reset with the next I-frame. The additional packet payloads are preferably not encrypted. The additional periodic encryption, without substantially increasing the computational complexity, further makes the frames not suitable for rendering content because of the encryption. In addition, in a cable networking environment, it is more difficult to hack the video stream to determine the keys with the periodic encryption of selected packet payloads.

In addition, preferably all the audio packet payloads are encrypted. In this manner, the audio would not be discernible which is especially suitable to avoid providing such content to children in a manner where the words can be heard.

The selective encryption of the encoded or transcoded bitstream may be applied to any suitable type of video encoding schema that includes a packet header and a corresponding payload, such as for example, MPEG-2 ("Motion Picture Expert Group"); MPEG-4 ("Motion Picture Expert Group"); Advanced Video Coding (AVC) also referred to as H.264 or MPEG-4 Part 10, Advanced Video Coding (MPEG-4 AVC); High Efficiency Video Coding (HEVC) also referred to as H.265 and MPEG-H Part 2, inclusive of Multiview extensions (MV-HEVC) and Scalability extensions (SHVC), etc. As previously described, such encoding and/or transcoding encodes video into groups of pictures that include periodic intra-encoded frames that form access points for initiating clean decoding without knowledge of previous data in the stream.

In addition, the selective encryption is likewise applicable to instantaneous decoder refresh coded pictures that are made up of I-slices or SI-slices, which are non-predicted frames. For example, an encoder sends an instantaneous decoder refresh (IDR) coded picture (made up of I- or SI-slices) to clear the contents of the reference picture buffer. On receiving an IDR coded picture, the decoder marks all pictures in the reference buffer as 'unused for reference'. All subsequent transmitted slices can be decoded without reference to any frame decoded prior to the IDR picture. The first picture in a coded video sequence is always an IDR picture. In general, such IDR coded pictures are preceded by initialization data in constructs referred to as sequence parameter sets (SPS), picture parameter sets (PPS), slice header, etc. As previously noted, temporally predicted frames (or slices) of video are either unidirectionally predicted (P) or bi-directionally predicted (B) frames (or slices), where the slices are preceded by just the slice header initialization data.

As previously described, the SPS, PPS and slice headers are used to initialize the set top box video decoder and typically have small size and fit within one to two MPEG transport stream (TS) packets. By encrypting the one to two TS packets that carry the PES header, SPS, PPS, and/or slice header of every frame, a set top box decoder will not be able to decode video unless it is authorized and has the proper decryption key(s). Thus, a hacker should not be able to view these partially and sparsely encrypted streams by tuning an unauthorized set top box. Following the slice header of every picture is compressed macroblock (MB) data. By way of example, the AVC and HEVC techniques use context-adaptive-binary-arithmetic-coding (CABAC) for further entropy coding of the video elements in the MB data stream. There will likely be a number of CABAC-compressed bytes of MB slice data in these one to two encrypted TS packets carrying the start of PES data. CABAC is a bit-serial compression algorithm that relies on prior context for future compression. If a hacker were to properly "guess" at decoder initialization values for the SPS, PPS, and slice headers, the hacker would also have to properly "guess" at the CABAC data bytes preceding the unencrypted, clear MB data bytes in subsequent TS packets to properly decode and render video data. This is also thought to be a difficult or prohibitively exhaustive task. By periodically encrypting some of the other video TS packets in the stream, again interrupting the CABAC MB data, the task of picture decoding is further hardened to an attacker not having decryption key(s).

As previously described, the portion of the system that has underlying data awareness and knowledge is used as a basis to determine which MPEG packets are marked for downstream encryption/decryption. By way of example, for video packets options include encrypting/decrypting:

(1) Packets with PES header start.

(2) Packets with PES header start, and the packet immediately following.

(3) Options 1 or 2 plus every Nth following video packet. N may be selected to trade off the value of the content versus the resources necessary to encrypt/decrypt the content. Such that higher value and resolution content could use a higher percentage of encrypted packets, versus lower value and resolution content using a lower percentage.

In many typical audio and video service scenarios, the total bandwidth allocated for audio is low enough, compared to video bandwidth, that it may be acceptable from a performance standpoint to encrypt all audio packets. However, if desired, a similar approach could be taken for audio content as well. With a portion of the system that is audio aware deciding which packets to encrypt/decrypt, and which ones to remain clear.

In addition to cable environments, the encryption and decryption techniques may be applied to streaming video.

Conceptually this approach could be applied to data other than audio or video. The approach remaining that the system portion knowledgeable in the data format would determine which packets are encrypted, reducing the required encryption/decryption effort to be cost effective while thwarting an attacker's ability to obtain clear data.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A cable distribution system that includes a head end connected to a plurality of customer devices through a transmission network that includes a remote fiber node that converts digital data to analog data suitable for said plurality of customer devices, where said head end includes a processor, comprising the steps of:

(a) providing a packetized elementary stream of a video including a series of sequential pictures from said head end to customer devices through said transmission network, wherein each of said series of sequential pictures of said packetized elementary stream includes a plurality of groups comprising pairs of packetized elementary stream headers and packetized elementary stream payloads of video data for said sequential pictures of a particular said video;

(b) determining a first one of said plurality of groups of said series of sequential pictures corresponding to a first non-predicted coded picture of said series of sequential pictures of said video of said packetized elementary stream, determining a second one of said plurality of groups of said series of sequential pictures corresponding to a second non-predicted coded picture of said series of sequential pictures of said video of said packetized elementary stream, where said second non-predicted coded picture is the next sequential non-predicted coded picture of said series of sequential pictures after said first non-predicted coded picture in said packetized elementary stream of said video;

(c) encrypting said first one of said plurality of groups said corresponding to said first non-predicted coded picture of said video, and encrypting said first one of said plurality of groups said corresponding to said second non-predicted coded picture of said video, encrypting a second one of said plurality of groups corresponding to said first non-predicted coded picture of said video that is temporally later than and next sequential to said first one of said plurality of groups of said first non-predicted coded picture of said video, encrypting a second one of said plurality of groups corresponding to said second non-predicted coded picture of said video that is temporally later than and next sequential to said first one of said plurality of groups of said second non-predicted coded picture of said video, while not encrypting any of said plurality of groups of said video defined by a range between said second one of said first non-predicted coded picture of said video and said first one of said second non-predicted coded picture, where encrypting said first one and said second one of said plurality of groups of said first non-predicted coded picture includes encrypting no more than the first two transport stream packets of said first non-predicted coded picture of said plurality of groups where said first non-predicted coded picture includes more than two transport stream packets and free from encrypting any of the remaining transport stream packets of said first non-predicted coded picture, where encrypting said first one and said second one of said plurality of groups of said second non-predicted coded picture includes encrypting no more than the first two transport stream packets of said second non-predicted coded picture of said plurality of groups where said second non-predicted coded picture includes more than two transport stream packets and free from encrypting any of the remaining transport stream packets of said second non-predicted coded picture;

(d) providing a signal from a conditional access system to a selected one of said plurality of customers that is suitable to be used to decrypt said first one and said second one of said plurality of groups of each of said first non-predicted coded picture and said second non-predicted coded picture.

2. The cable distribution system of claim 1 wherein said conditional access system provides an entitled control message and an entitled management message to said selected one of said plurality of customers.

3. The cable distribution system of claim 1 wherein said conditional access system provides an entitlement control message to said selected one of said plurality of customers.

4. The cable distribution system of claim 3 wherein said conditional access system provides a control word within said entitlement control message suitable to be used to decrypt said first one of said plurality of groups.

5. The cable distribution system of claim 1 wherein said packetized elementary stream is compliant with MPEG-2.

6. The cable distribution system of claim 1 wherein said packetized elementary stream is compliant with MPEG-4.

7. The cable distribution system of claim 1 wherein said packetized elementary stream is compliant with Advanced Video Coding.

8. The cable distribution system of claim 1 wherein said packetized elementary stream is compliant with High Efficiency Video Coding.

9. The cable distribution system of claim 1 wherein said packetized elementary stream further includes predictive coded pictures and bi-directionally predictive coded pictures.

10. The cable distribution system of claim 1 wherein said packetized elementary stream is provided on a QAM frequency.

11. The cable distribution system of claim 10 wherein a plurality of packetized elementary streams is provided on said QAM frequency.

12. The cable distribution system of claim 1 wherein said non-predicted coded frame of said video of said packetized elementary stream is an I-frame.

13. The cable distribution system of claim 1 wherein said non-predicted coded frame of said video of said packetized elementary stream is an IDR frame.

14. The cable distribution system of claim 1 wherein said non-predicted coded frame of said video of said packetized elementary stream is an I slice.

15. The cable distribution system of claim 1 wherein said non-predicted coded frame of said video of said packetized elementary stream is an SI slice.

16. A distribution system that includes a processor, comprising the steps of:

(a) providing a packetized elementary stream of a video including a series of sequential pictures from said head end to customer devices through said transmission network, wherein each of said series of sequential pictures of said packetized elementary stream includes a plurality of groups comprising pairs of packetized elementary stream headers and packetized elementary stream payloads of video data for said sequential pictures of a particular said video;

(b) determining a first one of said plurality of groups of said series of sequential pictures corresponding to a first non-predicted coded picture of said series of sequential pictures of said video of said packetized elementary stream, determining a second one of said plurality of groups of said series of sequential pictures corresponding to a second non-predicted coded picture of said series of sequential pictures of said video of said packetized elementary stream, where said second non-predicted coded picture is the next sequential non-predicted coded picture of said series of sequential pictures after said first non-predicted coded picture in said packetized elementary stream of said video;

(c) encrypting said first one of said plurality of groups said corresponding to said first non-predicted coded picture of said video, and encrypting said first one of said plurality of groups said corresponding to said second non-predicted coded picture of said video, encrypting a second one of said plurality of groups corresponding to said first non-predicted coded picture of said video that is temporally later than and next sequential to said first one of said plurality of groups of said first non-predicted coded picture of said video, encrypting a second one of said plurality of groups corresponding to said second non-predicted coded picture of said video that is temporally later than and next sequential to said first one of said plurality of groups of said second non-predicted coded picture of said video, while not encrypting any of said plurality of groups of said video defined by a range between said second one of said first non-predicted coded picture of said video and said first one of said second non-predicted coded picture, where encrypting said first one and said second one of said plurality of groups of said first non-predicted coded picture includes encrypting no more than the first two transport stream packets of said first non-predicted coded picture of said plurality of groups where said first non-predicted coded picture includes more than two transport stream packets and free from encrypting any of the remaining transport stream packets of said first non-predicted coded picture, where encrypting said first one and said second one of said plurality of groups of said second non-predicted coded picture includes encrypting no more than the first two transport stream packets of said second non-predicted coded picture of said plurality of groups where said second non-predicted coded picture includes more than two transport stream packets and free from encrypting any of the remaining transport stream packets of said second non-predicted coded picture;

(d) providing a signal from a conditional access system to a selected one of said plurality of customers that is suitable to be used to decrypt said first one and said second one of said plurality of groups of each of said first non-predicted coded picture and said second non-predicted coded picture.

\* \* \* \* \*